US 6,658,108 B1

(12) United States Patent
Bissell et al.

(10) Patent No.: US 6,658,108 B1
(45) Date of Patent: Dec. 2, 2003

(54) SYSTEM AND METHOD FOR DISTRIBUTING POWER OVER A PREMISES NETWORK

(75) Inventors: Stephen R. Bissell, Austin, TX (US); Larry A. Stell, Austin, TX (US); James Kevin McCoy, Garland, TX (US)

(73) Assignee: Premisenet Incorporated, Arlington, TX (US)

( * ) Notice: Subject to any disclaimer, the term of this patent is extended or adjusted under 35 U.S.C. 154(b) by 0 days.

(21) Appl. No.: 09/289,700

(22) Filed: Apr. 9, 1999

(51) Int. Cl.[7] ........................ H04M 19/08; H04M 11/00
(52) U.S. Cl. ................ 379/413; 379/90.01; 379/102.04
(58) Field of Search ........................... 379/102.04, 413; 340/310.01, 310.02–310.08; 307/29, 38–40

(56) References Cited

U.S. PATENT DOCUMENTS

| 4,058,678 A | 11/1977 | Dunn et al. ............... 179/2.5 R |
| 4,495,386 A | 1/1985 | Brown et al. ............... 179/2.51 |
| 4,701,945 A | 10/1987 | Pedigo ........................ 379/66 |
| 5,010,399 A | 4/1991 | Goodman et al. ............. 358/85 |
| 5,068,890 A | 11/1991 | Nilssen ......................... 379/90 |
| 5,125,026 A | 6/1992 | Holcombe ................... 379/167 |
| 5,210,788 A | 5/1993 | Nilssen ......................... 379/61 |
| 5,553,138 A | * 9/1996 | Heald et al. ................. 379/324 |
| 5,579,378 A | 11/1996 | Arlinghaus, Jr. ............. 379/106 |
| 5,963,146 A | * 10/1999 | Johnson et al. ........ 340/825.02 |
| 5,994,998 A | * 11/1999 | Fisher et al. ................. 375/257 |
| 6,115,468 A | * 9/2000 | De Nicolo ................... 375/257 |

FOREIGN PATENT DOCUMENTS

SU      1647759 A   * 5/1991       H02J/3/06

* cited by examiner

Primary Examiner—Forester W. Isen
Assistant Examiner—Daniel Swerdlow
(74) Attorney, Agent, or Firm—Baker Botts L.L.P.

(57) ABSTRACT

A system and method for distributing power over a premises network is provided. The system comprises a power receiving module operable to be coupled to a premises network located in a user site. A power source module is operable to be coupled to the premises network and a power supply. The power source module is operable to receive electrical power from the power supply and provide electrical power over the premises network such that the power is contained within the premises network.

26 Claims, 1 Drawing Sheet

SYSTEM AND METHOD FOR DISTRIBUTING POWER OVER A PREMISES NETWORK

TECHNICAL FIELD OF THE INVENTION

The present invention relates in general to the field of power supply systems and, more particularly, to a system and method for distributing power over a premises network.

BACKGROUND OF THE INVENTION

A premises network is a network that allows for communication between devices within a user site and devices outside of the user site. A conventional premises network can comprise a system of wire or cable coupled to various electronic devices within the user site. This premises network, in turn, couples to an external network to allow communication between the premises network and devices external to the user site. One example of such a premises network is a system of site telephone lines within a conventional multi-station telephone system. Another example of a premises network is a portion of a cable network within a home in a conventional cable television systems.

A multi-station telephone system includes one or more telephone lines connected to two or more electronic devices. In conventional multi-station telephone systems, a termination point located at the user site can be connected with a central office in a telephone network to provide the user site with one or more telephone lines. The termination point can be what is commonly called a "terminal strip."

Within the user site, site telephone lines can emanate from the terminal strip and connect to telephone outlets. In this manner, the telephone outlets can provide access to the telephone line or lines provided by the telephone network. Individual telephones and keysets as well as other electronic devices (e.g., facsimile machines, answering machines, modems, personal computers and peripherals, etc.) can be connected to the telephone outlets and thereby connected to the telephone line or lines. With respect to a telephone line, the topology of a multi-station telephone system is often a star configuration, although other topologies are possible.

The site telephone lines within a user site are one example of a "premises network." The electronic devices connected to the telephone outlets can communicate over the premises network over the telephone line with the central office. Additionally, some systems allow the electronic devices to communicate with each other over the premises network, as disclosed in U.S. Pat. No. 5,809,111, entitled "Telephone Control Module and User Site Network and Methods of Operation", issued to Gordon H. Matthews.

The electronic devices coupled to the premises network require power for operation. If the premises network comprises site telephone lines coupled to a conventional telephone network, the conventional telephone network does provide power for some electronic devices through the premises network. For example, simple telephones that are coupled to the premises network can receive power through the premises network. However, other electronic devices, such as facsimile machines, answering machines, or sophisticated telephones, require power separate from the power provided through the premises network.

These electronic devices typically obtain power from a separate power supply system within the user site to which the electronic device must be coupled. For example, a facsimile machine may couple both to the premises network through an RJ-11 telephone jack, and also to a power supply system through a conventional wall power outlet. Such a system is disadvantageous because it requires the electronic device to be coupled to two separate systems: the premises network and the power supply network.

Alternatively, such an electronic device may obtain power from a separate or self-contained power supply, such as a battery. Such systems are disadvantageous because the electronic device can become disabled once the battery power has run out.

Strict requirements have been placed upon the loading conditions of a premises network that is part of a telecommunications network. Namely, activity on such a premises network cannot interfere with communications over the network. Additionally, any loading placed upon the premises network must not interfere with the operations of a central office that is part of the telecommunications network.

SUMMARY OF THE INVENTION

In accordance with the present invention, a system and method for distributing power over a premises network is disclosed that provides significant advantages over prior developed power supply systems.

According to one aspect of the present invention, a power receiving module is operable to be coupled to a premises network. A power source module is operable to be coupled to the premises network and a power supply. The power source module is operable to receive electrical power from the power supply and provide electrical power to the power receiving module over the premises network such that the power is contained within the premises network.

In one embodiment, the premises network comprises site telephone wiring coupled to a telephone line provided by a telephone network. In a further embodiment, the power source module provides electrical power over the site telephone line as an alternating current signal in an out of band frequency such that a central office associated with the telephone network is not degraded in operation. In another embodiment, the power source module is operable to provide an off-hook signal to a central office associated with the telephone network before providing power to the power receiving module.

In a further embodiment, the power source module comprises a direct current source and the power receiving module comprises a direct current sink. The direct current source and the direct current sink are matched such that the power supplied by the power source module is contained within the premises network.

In another aspect of the current invention, a method for distributing power over a premises network comprises receiving electrical power with a power source module from a power supply. Electrical power is provided from the power source module over the premises network to a power receiving module such that the power is contained within the premises network.

It is a technical advantage of the present invention that power can be supplied to an electronic device over a premises network. This alleviates the requirement for each electronic device to be coupled to two separate systems.

It is another technical advantage that a battery operated electronic device can have its battery recharged through the premises network.

It is a further technical advantage that power can be supplied over a premises network without disrupting the operation of a central office coupled to the premises network.

Other technical advantages should be apparent to one of ordinary skill in the art in view of this specification claims and drawings.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

Figure 1:
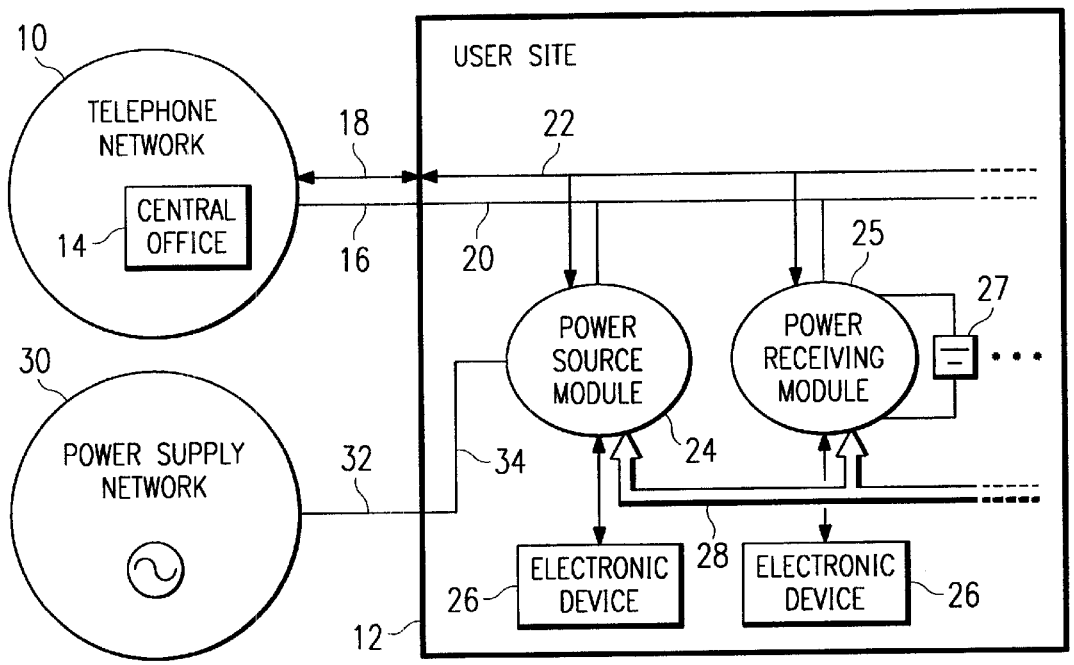
FIG. 1 is a block diagram of one embodiment of a system for distributing power over a premises network according to the present invention.

FIG. 1 is a block diagram of one embodiment of a system for distributing power over a premises network according to the present invention. The embodiment of FIG. 1 is discussed with respect to a telephone network. However, those skilled in the art will recognize that the present invention has application to other types of networks that include a premises network. For example, one such other premises network could include a cable network.

A telephone network 10 includes a central office 14 and is coupled to a user site 12 through a telephone line 16. Telephone network 10 can be a local telephone network, cellular network, cable system based telephone network, or other network providing telecommunication activity. Telephone line 16 supports telephone line communications 18 between telephone network 10 and user site 12. Telephone line 16 can comprise a combination of copper wire, optical fiber, radio frequency transmissions, or other medium upon or through which telephone line communications 18 can be supported. Telephone line communications 18 can be based upon ISDN, POTS, or other telephone line communication protocol.

User site 12 includes a premises network 20 which is coupled to telephone line 16 provided by telephone network 10. Premises network 20 can comprise, for example, a site telephone line comprised of twisted pair wiring. In the embodiment of FIG. 1, premises network 20 supports telephone line communications 22 in user site 12. Telephone line communications 22 can be based upon an ISDN, POTS, or other telephone communication protocol as appropriate for user site 12.

User site 12 further includes a power source module 24 and at least one power receiving module 25 coupled to premises network 20. Power source module 24 and power receiving module 25 can each be further coupled to an electronic device 26. Power receiving module 25 is additionally coupled to a power storage device 27. Power storage device 27 can comprise, for example, a battery. Power source module 24 is further coupled to a power supply 30. For example, power supply 30 could comprise a conventional power generating station coupled to power source module 24 through a site power supply line 34. Such a conventional power supply network 30 could supply 120 watt power at 60 Hz.

In the embodiment of FIG. 1, power source module 24 and power receiving module 25 can communicate via network communications 28. Network communications 28 can be supported by premises network 20, by electromagnetic transmissions (i.e., radio frequency infrared signals) or by another appropriate medium.

Network communications 28 can be supported by premises network 20 without disrupting the operation of electronic device 26, telephone line communications 22, telephone line communications 18, telephone line 16, central office 14, or other telephone network 10. In order to do so, network communications 28 can be implemented using a packet base protocol carried by a modulated high frequency signal communicated across site telephone line 20. An example of such a protocol and implementation therewith, is provided for example by U.S. Pat. No. 5,809,111, entitled "Telephone Control Module for a User Site Based Network" and issued to Gordon H. Matthews.

In operation, power receiving module 25 detects that power storage device 27 is in need of power. Power receiving module communicates this need to power source module 24 through network communications 28. Power source module 24 then converts power from power supply 30 and transmits the power over premises network 20 to power receiving module 25. Power receiving module 25 then provides the power to power storage device 27. When power is no longer needed, power receiving module 25 can so indicate to power source module 24 over network communications 28.

Power source module 24 can provide power to power receiving module 25 in various ways. In one embodiment of the present invention, power source module 24 provides power by placing an alternating current (AC) onto premises network 20 in an out of band frequency. An out of band frequency is a frequency that is unused, as defined by the United States Federal Communications Commission ("FCC") requirements for telephone communication. For example, current FCC requirements define the voice band as between 400 Hz and 3.4 kHz. An out of band signal, then, could comprise a signal below 400 Hz. For example, power source module 24 could convert power from power supply network 30 into an AC signal with a frequency of below 100 Hz. Power receiving module 25 could then use the AC signal generated by power source module 24 for power. Such a transfer can be performed without interfering with telephone communications 22 on premises network 20.

Additionally, FCC requirements place limitations on the power of an in-band signal on premises network 20 that would be visible to central office 14. The transmission of a power signal in an out of band frequency can allow power source module 24 to transfer power to power receiving module 25 with a signal that is in compliance with signal power limitations of central office 14.

In an alternate embodiment, power source module 24 can provide power on telephone line 20 by acting as a direct current (DC) source. In such an embodiment, power receiving module 25 can operate as a DC sink. Power source module 24 and power receiving module 25 match such that no current escapes the premises network 20. As such, the power would be contained within the premises network.

Additionally, if multiple power receiving modules 25 are coupled to premises network 20, the sum of each of these current sinks could match the current source of power source module 24. Power receiving modules 25 and power source module 24 can communicate through network communications 28 to control the system.

For example, power receiving module 25 could communicate via network communications 28 with power source module to request power. Power source module 24 could respond via network communications 28 and inform power receiving module 25 of the timing, duration, and strength of the power that will be provided over premises network 20. Therefore, power receiving module 25 could calibrate itself so as to capture the current provided by power source module 24. Such an embodiment could provide power over premises network 20 while containing the power within premises network 20.

An alternate embodiment could include power source module 24 providing or detecting an "off hook" signal to central office 14 before providing power on premises network 20. For example, during an "on hook" condition premises network 20 may have a voltage of 48V with no current flowing from central office 14 into user site 12. An "off hook" event is created when sufficient load is placed on premises network 20 to draw current from central office 14 greater than the "off hook" threshold (about 20 mA). During the "off hook" event the current flowing through the series resistance of telephone line 16 between central office 14 and user site 12 will cause a drop in voltage on premises network 20. Upon detection of an "off hook" event power source module 24 could provide power to power receiving module 25 by sourcing current onto premise network 20 at a fixed voltage level below a level necessary to maintain an "off hook" event and above a level required by power receiving module 25. As power receiving module 25 draws additional current from premises network 20, power source module 24 clamps the voltage on premises network 20 and supplies the required load to power receiving module 25. One such example of an implementation could use a diode to isolate premises network 20 from the fixed voltage source in power source module 24 during the "on-hook" condition. When premises network 20 drops below the fixed voltage level the diode conducts.

One disadvantage of such an embodiment could be that in certain instances, premises network 20 would be unavailable for outside communication. To optimize availability, power source module 24 and power receiving module 25 could communicate via network communications 28 so as to minimize the timing of the off hook status.

Figure 2:
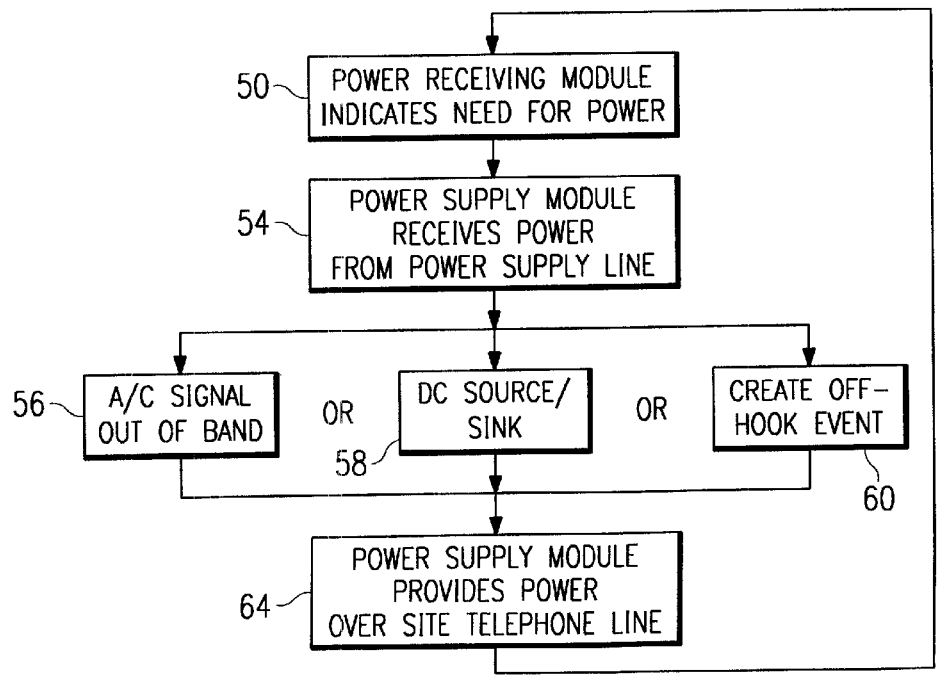
FIG. 2 is a flow diagram of one embodiment of a method for distributing power over a premises network according to the present invention.

FIG. 2 is a flow diagram of one embodiment of a method for distributing power over a premises network according to the present invention. At step 50, a power receiving module indicates a need for power. Such indication could be communicated to a power source module by network communications. As discussed above, such network communications could take the form of a high frequency packet-based protocol communicated over the premises network. At step 54, the power source module receives power from a power supply. After step 54, power source module can take three alternative actions. At step 56, power source module creates an AC signal that is an out-of-band frequency. As discussed with respect to FIG. 1, such out-of-band frequency could comprise a frequency below 100 Hz. Alternatively, at step 58, power source module could comprise a DC current source. Concurrently, at step 58, the power receiving module comprises a DC current sink. The DC current source and DC current sink evenly match such that current is contained within the premises network.

Alternatively to step 56 or step 58, at step 60, the power source module sends an off-hook signal to an associated central office. As discussed with respect to FIG. 1, an off-hook signal forces a central office to perceive an operational electronic device located on the premises network. A further alternative embodiment could include the power source module detecting an off-hook signal at step 60. The off-hook signal could be generated, for example, by a power receiving module.

At step 64, power source module provides power over the premises network to the power receiving module. Step 64 will present slightly differently, depending upon which of the alternative steps, 56, 58 or 60 is used by the power source module. The method then returns to step 50 wherein the power receiving module can indicate a further need for power.

It is a technical advantage of the present invention that power can be supplied to an electronic device over a premises network. This alleviates the requirement for each electronic device to be coupled to two separate systems.

It is another technical advantage that a battery operated electronic device can have its battery recharged through the premises network.

It is a further technical advantage that power can be supplied over a premises network without disrupting the operation of a central office coupled to the premises network.

Although the present invention has been described in detail, it should be understood that various changes, substitutions and alterations can be made thereto without departing from the spirit and scope of the invention as defined by the appended claims.

What is claimed is:

1. A system for distributing power over site telephone wiring which is part of a telephone network, the system comprising:

a power receiving module including a direct current sink, the power receiving module operable to be coupled to the site telephone wiring;

a power source module including a direct current source, the power source module operable to be coupled to the site telephone wiring and a power supply; and the power source module further operable to receive electrical power from the power supply and provide electrical power to the power receiving module over the site telephone wiring without disrupting operation of a central office coupled to the telephone network, wherein the direct current sink matches to the direct current source based on parameters received from the power source module such that the power supplied by the power source module is contained within the site telephone wiring.

2. The system of claim 1, wherein the site telephone wiring comprises twisted pair wiring.

3. The system of claim 1, wherein the power source module provides the power over the site telephone wiring as an alternating current signal in an out of band frequency.

4. The system of claim 1, wherein the power source module is operable to provide an off-hook signal to the central office associated with the telephone network before providing power to the power receiving module.

5. The system of claim 1, wherein the power source module is operable to detect an off-hook signal to the central office associated with the telephone network before providing power to the power receiving module.

6. The system of claim 1, wherein the power receiving module is coupled to an electronic device, and wherein the power receiving module supplies power to the electronic device.

7. The system of claim 1, wherein the power source module is coupled to an electronic device, and wherein the power source module provides power to the electronic device.

8. The system of claim 1, wherein the power source module and the power receiving module are operable to communicate over the site telephone wiring.

9. The system of claim 1, further comprising a power storage device coupled to the power receiving module.

10. The system of claim 9, wherein the power storage device comprises a battery.

11. A system for distributing power over site telephone wiring which is part of a telephone network, the system comprising:
- a plurality of power receiving modules each including a direct current sink, the power receiving modules operable to be coupled to the site telephone wiring;
- a power source module including a direct current source, the power source module operable to be coupled to the site telephone wiring and a power supply; and
- the power source module operable to receive electrical power from the power supply and provide electrical power to the power receiving modules over the site telephone wiring without disrupting operation of a central office coupled to the telephone network, wherein a sum of the currents sunk by direct current sinks is matched to the current produced by the direct current source based on parameters received from the power source module such that the power supplied by the power source module is contained within the site telephone wiring.

12. The system of claim 11, wherein the site telephone wiring comprises twisted pair wiring.

13. The system of claim 11, wherein the power source module provides the power over the site telephone wiring as an alternating current signal in an out of band frequency.

14. The system of claim 11, wherein the power source module is operable to provide an off-hook signal to the central office associated with the telephone network before providing power to the power receiving module.

15. The system of claim 11, wherein the power source module is operable to detect an off-hook signal to the central office associated with the telephone network before providing power to the power receiving module.

16. The system of claim 11, wherein the power receiving modules are each coupled to an electronic device, and wherein the power receiving modules supply power to the electronic devices.

17. The system of claim 11, wherein the power source module is coupled to an electronic device, and wherein the power source module provides power to the electronic device.

18. The system of claim 11, wherein the power source module and the power receiving modules are operable to communicate over the site telephone wiring.

19. The system of claim 11, further comprising a power storage device coupled to each of the power receiving modules.

20. The system of claim 19, wherein the power storage device comprises a battery.

21. A method for distributing power over site telephone wiring which is part of a telephone network, the method comprising:
- receiving electrical power with a power source module from a power supply; and
- providing electrical power from the power source module over the site telephone wiring to a power receiving module without disrupting operation of a central office coupled to the telephone network, the electrical power provided by creating a direct current source and a direct current sink, wherein the direct current sink matches with the direct current source based on parameters received by the power source module such that the power supplied by the power source module is contained within the site telephone wiring.

22. The method of claim 21, wherein the site telephone wiring comprises twisted pair wiring.

23. The method of claim 21, further comprising providing the electrical power as an alternating current signal in an out of band frequency.

24. The method of claim 21, further comprising providing an off-hook signal to the central office associated with the telephone network before providing power to the power receiving module.

25. The method of claim 21, further comprising detecting an off-hook signal to the central office associated with the telephone network before providing power to the power receiving module.

26. The method of claim 21, further comprising communicating between the power source module and the power receiving module over the site telephone wiring.

* * * * *